(12) United States Patent
Fauteux et al.

(10) Patent No.: US 6,168,878 B1
(45) Date of Patent: Jan. 2, 2001

(54) ELECTROCHEMICAL CELL HAVING A CONTROLLED ELECTRODE SURFACE AND ASSOCIATED FABRICATION AND CHEMICAL PROCESS

(75) Inventors: Denis G. Fauteux, Acton; Martin Van Buren, Chelmsford; Eric S. Kolb, Acton, all of MA (US)

(73) Assignee: Mitsubishi Chemical Corporation, Tokyo (JP)

( * ) Notice: Under 35 U.S.C. 154(b), the term of this patent shall be extended for 0 days.

(21) Appl. No.: 09/208,895

(22) Filed: Dec. 10, 1998

Related U.S. Application Data

(63) Continuation-in-part of application No. 09/178,846, filed on Oct. 26, 1998, now Pat. No. 6,045,937.

(51) Int. Cl.⁷ .................................................. H01M 10/34
(52) U.S. Cl. ............................... 429/59; 429/57; 429/105
(58) Field of Search ............................... 429/57, 59, 216, 429/331, 105, 248

(56) References Cited

U.S. PATENT DOCUMENTS 5,529,859   6/1996   Shu et al. .
5,626,981   5/1997   Simon et al. .

FOREIGN PATENT DOCUMENTS 7-220756   8/1995   (JP) .
8-273700   10/1996   (JP) .

*Primary Examiner*—Maria Nuzzolillo
*Assistant Examiner*—Tracy Dove
(74) *Attorney, Agent, or Firm*—Factor & Partners

(57) ABSTRACT

An electrochemical cell, and an associated process, wherein the cell includes a controlled electrode surface comprising an electrode with a metallic current collector having a surface, an electrolyte and a reduced additive. The invention further includes a passivating layer at the interface between the metallic current collector and the electrolyte. The passivating layer includes the reduced additive. This passivating layer substantially precludes contact between electrolyte solvent and surface of the metallic current collector to, in turn, substantially prevent gas formation within the cell, which would otherwise result from decomposition of the solvent upon contact with the surface of the metallic current collector. Also, the reduced additive will likewise be substantially precluded from generating a gas upon its decomposition.

15 Claims, 3 Drawing Sheets

ELECTROCHEMICAL CELL HAVING A CONTROLLED ELECTRODE SURFACE AND ASSOCIATED FABRICATION AND CHEMICAL PROCESS

This is a Continuation-In-Part of U.S. application Ser. No. 09/178,846, filed Oct. 26, 1998, now U.S. Pat. No. 6,045,937.

BACKGROUND OF THE INVENTION

1. Field of the Invention

The present invention relates in general to secondary electrochemical cells, and more particularly, to lithium electrochemical cells having metallic current collectors and associated fabrication and chemical processes utilizing an in situ reduced additive which substantially precludes gas formation within the cell as a result of decomposition of solvents used in association with the electrolyte, and, wherein the additive itself is substantially precluded from forming a gas from its own decomposition during cell cycling and storage.

2. Background Art

Lithium batteries have been known in the art for several years. Furthermore, lithium batteries using liquid, gel, polymer, or plastic electrolytes which utilize metallic current collectors are likewise well known. While such electrolytes have been readily utilized, problems have been identified with respect to commercial solvents, utilized within the electrolyte, decomposing during cell cycling and storage. In particular, without the presence of at least a conventional additive within the cell to form a passivating layer, the solvent reacts with the electrode interface and partially decomposes during cycling and storage. Such a decomposition results in the formation of significant amounts of gas which adversely affect the cell's electrochemical performance, especially coulombic efficiency.

Although conventional additives have been used to form a passivating layer which substantially blocks the solvent from contact with the electrode, problems nevertheless persist. Specifically, the additive itself undergoes decomposition during cell cycling and storage, and, such decomposition likewise results in the generation of significant amounts of gas within the cell.

SUMMARY OF THE INVENTION

The present invention is directed to an electrochemical cell having a controlled electrode surface comprising a first electrode and a second electrode wherein at least one of the first and second electrodes includes a metallic current collector having a surface, an electrolyte including at least one solvent, and an additive or a reduced additive associated with the surface of the metallic current collector. The reduced additive is substantially insoluble in the electrolyte and is preferably reduced in situ.

The invention also includes passivating means including the additive or reduced additive for substantially precluding contact between the solvent of the electrolyte and the surface of the metallic current collector to, in turn, substantially prevent gas formation within the cell, which would otherwise result from decomposition of the solvent upon contact with the surface of the metallic current collector. Means are associated with the additive or reduced additive for substantially precluding gas formation within the electrochemical cell as a result of decomposition of the additive or reduced additive near the surface of the metallic current collector during cell cycling and storage. In a preferred embodiment of the invention, the electrochemical cell exhibits a first cycle coulombic efficiency greater than 91% and a first through tenth cycle coulombic efficiency greater than 85%.

In yet another preferred embodiment, the invention includes means for substantially precluding dendrite formation near the surface of the metallic current collector.

The present invention is also directed to a process for manufacturing an electrochemical cell comprising the steps of: a) fabricating a first and a second electrode wherein at least one of the electrodes includes a metallic current collector having a surface; b) associating at least one electrolyte, having at least one solvent, with the first and second electrodes; and c) associating an additive with at least one of the electrolyte or the surface of the at least one metallic current collector.

The present invention is also directed to a chemical process for an electrochemical cell comprising the steps of: a) fabricating a first and a second electrode wherein at least one of the electrodes includes a metallic current collector having a surface; b) associating at least one electrolyte, having at least one solvent, with the first and second electrodes; c) associating an additive with at least one of the electrolyte or the surface of the at least one metallic current collector; and d) forming a passivating layer between the surface of the metallic current collector and the electrolyte; wherein the step of forming the passivating layer includes the steps of: 1) charging the electrochemical cell; 2) substantially reducing the additive near the surface of the metallic current collector so that the reduced additive is substantially insoluble with the electrolyte; 3) substantially blocking the at least one solvent in the electrolyte from chemical interaction with the surface of the metallic current collector; and 4) substantially precluding gas formation within the electrochemical cell as a result of decomposition of the additive or reduced additive during cell cycling and storage.

BRIEF DESCRIPTION OF THE DRAWINGS

The invention will now be described with reference to the drawings wherein.

DETAILED DESCRIPTION OF THE DRAWINGS

Figure 1:
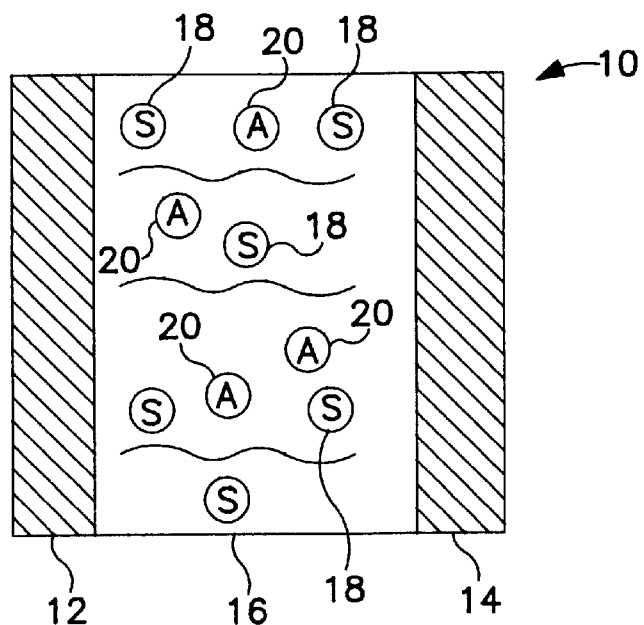
FIG. 1 of the drawings is a schematic representation of a prior art electrochemical cell prior to an initial charge.

While this invention is susceptible of embodiment in many different forms, there is shown in the drawings and will herein be described in detail several embodiments with the understanding that the present disclosure is to be considered as an exemplification of the principles of the invention and is not intended to limit the invention to the embodiments illustrated.

Prior art electrochemical cell 10 is shown in FIG. 1, prior to an application of an electrical charge, as generally comprising first electrode 12, second electrode 14, and electrolyte 16. Electrolyte 16 includes solvent 18 and conventional additive 20.

Figure 2:
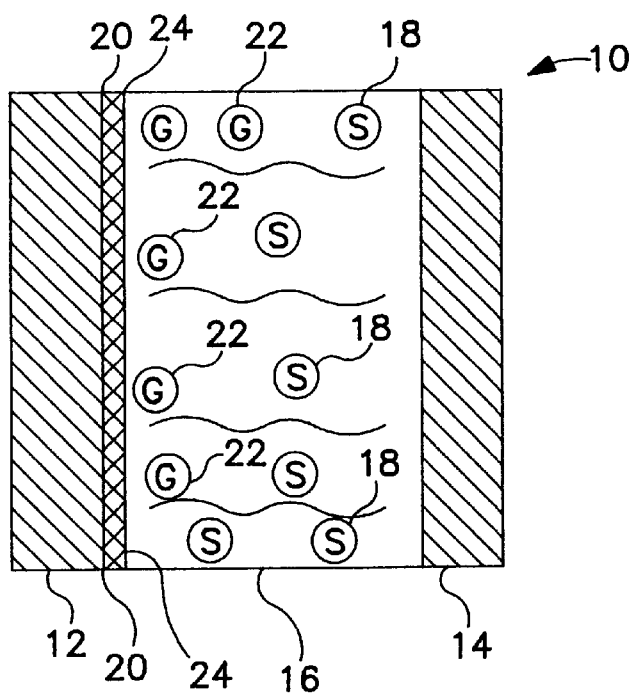
FIG. 2 of the drawings is a schematic representation of a prior art electrochemical cell subsequent to an initial charge.

Prior art electrode 10 is shown in FIG. 2, subsequent to an initial electrical charge as generally comprising first electrode 12, second electrode 14, electrolyte 16 and passivating layer 20'. Passivating layer 20' is formed, in part, upon association of the conventional additive with the electrode—prior to interaction by the solvent in the electrolyte. Although such a passivating layer substantially blocks the solvent from contact with the electrode, it will, unfortunately, generate significant amounts of gas as it begins to decompose during cell cycling and storage.

Figure 3:
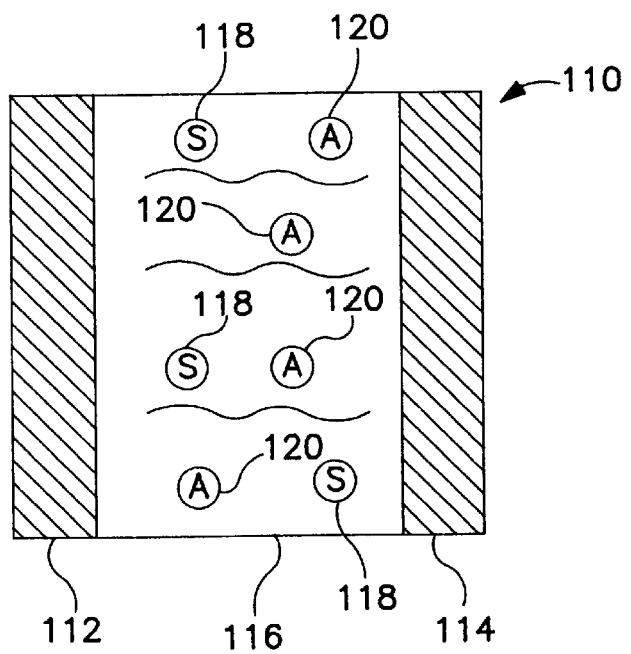
FIG. 3 of the drawings is a schematic representation of an electrochemical cell in accordance with the present invention prior to an initial charge.

Electrochemical cell 110 of the present invention is shown in FIG. 3 prior to application of an initial electrical charge, as generally comprising first electrode 112, second electrode 114, and electrolyte 116. Electrode 112 preferably comprises a metallic current collector, such as copper. While copper has been disclosed as a preferred current collector, any one of a number of metal or metallic species that can be produced in a thin foil of less than 25 um and does not form an alloy or intercalate with lithium are likewise contemplated for use.

Electrolyte 116 includes solvent 118 and additive 120. While additive 120 is shown, for illustrative purposes only, as initially associated with electrolyte 116, it is also contemplated that additive 120 can be associated with first electrode 112. Such association can be accomplished by any number of conventional techniques including, but not limited to, spraying, rolling, or coating the electrode with the additive. When an additive which is substantially soluble with the electrolyte, such as succinic anhydride, is to be utilized, then it can be mixed with the electrolyte at almost any time, also using conventional mixing techniques.

Furthermore, while additive 120 will be exemplified in the experiments discussed in detail below as generally comprising phosphites, carboxylates, thiophenes, and anhydrides, it will be understood that such disclosure to specific compounds is merely illustrative of acceptable additives, and is by no means intended to be an exhaustive compilation of all suitable additives. Indeed, it will be understood that acceptable additives exhibit the following characteristics: 1) they can be either soluble or insoluble with the associated electrolyte prior to reduction, yet substantially insoluble with the electrolyte after reduction; 2) they can be modified to a reduced state substantially without forming a gas; 3) they form a passivating layer on the surface of a metallic current collector so as to substantially block the solvent within the electrolyte from contacting the surface of the metallic current collector, and, in turn from decomposing and generating an uncontrolled passivation layer and gas as would otherwise occur upon interaction between the solvent and the electrode surface; 4) they result in a cell with an increase in first cycle coulombic efficiency relative to a cell without such an additive; and 5) they substantially preclude dendrite formation within the cell. Examples of just some of such additives exhibiting the above-identified properties include, but are in no way limited to HTP, TPP, A-4, SA, DSA, THPA, PMD, BEC, and EDTDA, each of which have the following respective chemical structures:

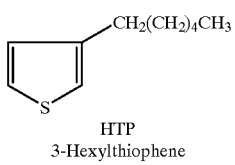

HTP
3-Hexylthiophene

-continued

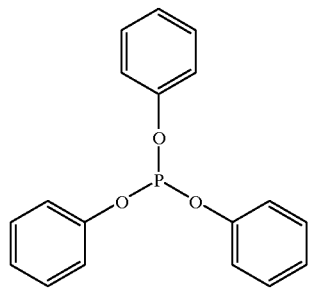

TPP
Triphenyl phosphite

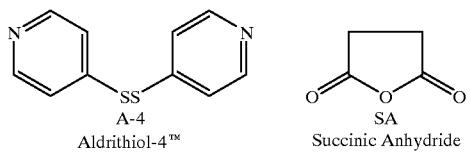

A-4
Aldrithiol-4™

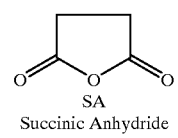

SA
Succinic Anhydride

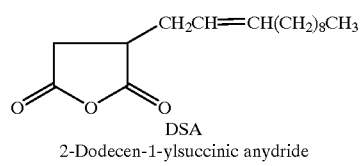

DSA
2-Dodecen-1-ylsuccinic anydride

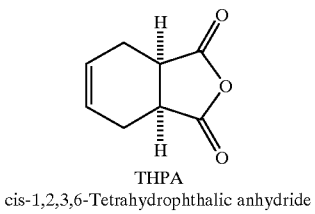

THPA
cis-1,2,3,6-Tetrahydrophthalic anhydride

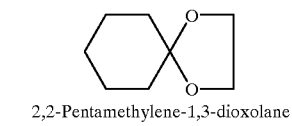

2,2-Pentamethylene-1,3-dioxolane

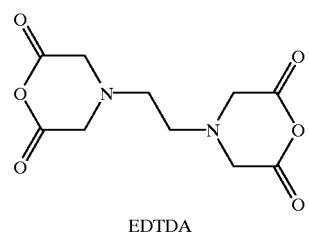

EDTDA
Ethylenediaminetetracetic dianhydride

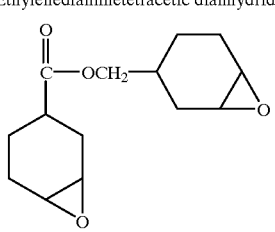

BEC
3,4-Epoxycyclohexylmethyl
3,4-epoxycyclohexanecarboxylate

Also, for purposes of the present disclosure, solvent 118 will be identified as comprising an organic carbonate solvent, such as propylene carbonate (PC) or ethylene carbonate (EC), although other commercially available and conventionally used solvents or electrochemical systems (such as liquid (ethers), polymer, gel, and plastic) as would be readily understood to those having ordinary skill in the art having the present disclosure before them, are likewise contemplated for use.

Figure 4:
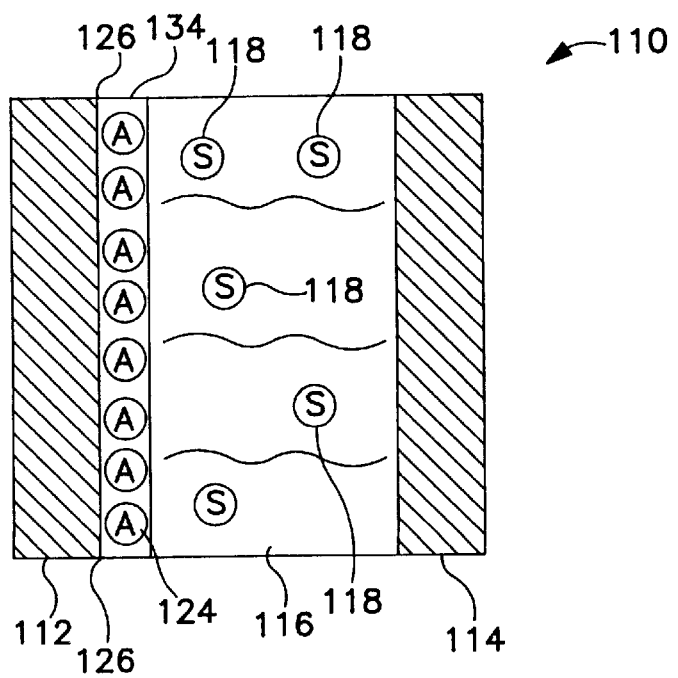
FIG. 4 of the drawings is a schematic representation of an electrochemical cell in accordance with the present invention subsequent to an initial charge.

Electrochemical cell 110 is shown in FIG. 4, subsequent to application of an initial charge, as including passivating layer 124 on surface 126 of metallic current collector 112. As will be explained in greater detail, the passivating layer forms as a result of reducing the additive adjacent the interface between electrolyte 116 and surface 126 of metallic current collector 112. As previously explained, such a passivating layer will substantially block solvent 118 from contacting the surface 126 and, in turn, substantially preclude the generation of gas which would otherwise result from decomposition of the solvent. As also explained, even though the additive itself will eventually decompose, such decomposition will not result in the generation of any significant, if any, gas. Accordingly, it has been found that not only is gas generation substantially eliminated, but, that the cells coulombic efficiency can be impressively increased as compared to cells which were fabricated without an additive of the present invention. Details relating to such efficiency will be discussed in greater detail below.

Figure 5:
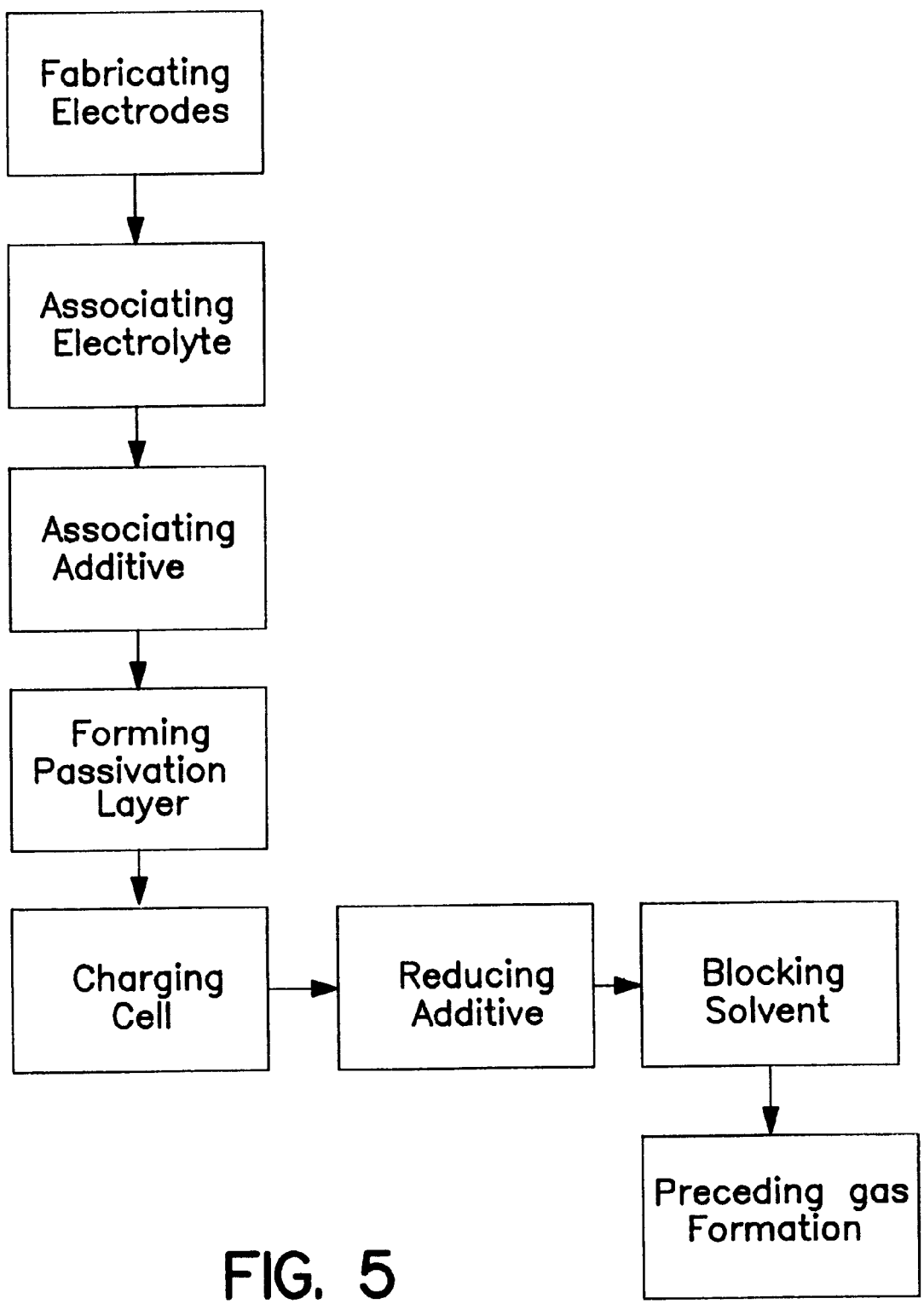
FIG. 5 of the drawings is a flow chart of the chemical process of the present invention.

The process associated with the manufacture of electrochemical cell 110 (FIGS. 3 and 4), as well as the actual chemical process which occurs within the cell upon initial electrical charging, is identified in FIG. 5, as including the following steps: First, the initial cell is manufactured by fabricating first electrode 112, second electrode 114, and electrolyte 116. For purposes of the present disclosure, first electrode 112 will comprise an anode having a metallic current collector 126, and a second electrode 114 will comprise a cathode. Of course, in a secondary cell configuration, the anode and cathode will become interchangeable with each other, depending on whether the cell is charging or discharging. The particular electrolyte, as well as the electrodes, will be fabricated using conventional techniques. Additionally, solvent 118 and additive 120, may initially be associated with electrolyte 116. However, as previously explained, additive 120 may alternatively, or likewise, be associated with one or both of electrodes 112 and 114, respectively.

After electrochemical cell 110 has been fabricated, passivating layer 124 is at least partially formed by applying an initial charge to the cell. After the initial charge is applied, additive 120 is reduced near the interface between surface 126 of first electrode 112 and electrolyte 116. The term "reduced" is understood not only to be a formal reduction, but also as any alteration from the additive's original, pre-reduced state. Such a reduction includes any modification to the chemical structure of the additive so that it is at least substantially insoluble within the electrolyte 116, or, alternatively associated with the surface of the metallic current collector.

The passivating layer substantially blocks solvent 118 in electrolyte 116 from contact with the surface of the metallic current collector. Accordingly, such blocking substantially precludes solvent decomposition, and, more particularly, gas formation within electrochemical cell 110.

Inasmuch as solvent decomposition, which would otherwise occur upon contact with the electrode surface, and decomposition of a conventional additive, results in a substantial loss of coulombic efficiency, it has been found that the use of an additive of the present invention results in an electrochemical cell having a first cycle, and in some cases a first through tenth cycle, coulombic efficiency substantially greater than a cell with out such an additive.

Indeed, in support of such an increase in electrochemical performance, several electrochemical cells were fabricated using various additives which were subsequently characterized. The experimental method and results are summarized herein below.

First, several electrochemical cells were fabricated wherein, the cells comprised a copper current collector (anode), a lithium metal cathode with a lithium metal reference electrode, and an additive (0.5–5.0% by wt.) in a 1M LiAsF$_6$—PC electrolyte solution. Once fabricated, cyclic voltammetry was used to measure how efficiently the additive formed the passivation layer within the electrochemical cell. The fabricated cells were cycled from 3.0 volts down to 0.0 volts in a stepped fashion. The voltammetry results were converted to coulombic efficiency and tabulated for ten cycles, as shown below in Table I. A number approaching 100% is preferred.

TABLE I

| | % Coulombic Efficiency | | | | | | | | | |
|---|---|---|---|---|---|---|---|---|---|---|
| Additive | C/1 | C/2 | C/3 | C/4 | C/5 | C/6 | C/7 | C/8 | C/9 | C/10 |
| None | 84 | 57 | 57 | 55 | 48 | 45 | 39 | 30 | 25 | 21 |
| HTP(2%) | 58 | 88 | 90 | 90 | 88 | 83 | 79 | 77 | 73 | 65 |
| HTP(1%) | 60 | 88 | 84 | 75 | 65 | 62 | 49 | 40 | 28 | 18 |
| TPP | 41 | 59 | 62 | 40 | 25 | 12 | 05 | 05 | 05 | 05 |
| A-4 | 40 | 62 | 73 | 80 | 85 | 80 | 73 | 70 | 69 | 65 |
| SA | 91 | 92 | 93 | 94 | 91 | 92 | 93 | 87 | 89 | 88 |
| DSA | 28 | 27 | 28 | 35 | 30 | 19 | 25 | 39 | 25 | 19 |
| THPA | 55 | 72 | 69 | 50 | 33 | 26 | 18 | 07 | 07 | 08 |
| PMD | 50 | 80 | 57 | 53 | 58 | 53 | 45 | 30 | 23 | 22 |
| BEC | 54 | 80 | 65 | 67 | 71 | 67 | 67 | 61 | 53 | 41 |
| EDTDA | 57 | 75 | 64 | 62 | 53 | 41 | 29 | 20 | 19 | 13 |

As can be seen, although many of the above-identified additives exhibited favorable results compared to no additive, SA, HTP(1%), and BEC exhibited extremely favorable values for first through tenth cycle coulombic efficiency. In addition SA exhibited an extremely high first cycle coulombic efficiency of 91%.

The foregoing description and drawings merely explain and illustrate the invention and the invention is not limited thereto except insofar as the appended claims are so limited, as those skilled in the art who have the disclosure before them will be able to make modifications and variation therein without departing from the scope of the invention.

What is claimed is:

1. An electrochemical cell having a controlled electrode surface comprising:
   a first electrode and a second electrode wherein at least one of the first and second electrodes includes a metallic current collector having a surface;

an electrolyte including at least one solvent;

a reduced additive associated with the surface of the at least one metallic current collector;

wherein the reduced additive precludes contact between the at least one solvent of the electrolyte and the surface of the at least one metallic current collector to, in turn, prevent gas formation within the cell, which would otherwise result from decomposition of the solvent upon contact with the surface of the at least one metallic current collector; and wherein the reduced additive precludes gas formation within the electrochemical cell as a result of decomposition of the reduced additive at the surface of the at least one metallic current collector during cell cycling and storage.

2. The electrochemical cell according to claim 1, wherein the additive increases the coulombic efficiency of the electrochemical cell relative to an electrochemical cell without the reduced additive.

3. The electrochemical cell according to claim 2, wherein the first through tenth cycle coulombic efficiency is greater than 85%.

4. The electrochemical cell according to claim 2, wherein the first cycle coulombic efficiency is greater than 91%.

5. The electrochemical cell according to claim 1, wherein the additive further precludes dendrite formation near the surface of the at least one metallic current collector.

6. The electrochemical cell according to claim 1, wherein the reduced additive is either soluble or insoluble in the electrolyte prior to reduction.

7. The electrochemical cell according to claim 1, wherein the metallic current collector comprises a thin metal foil of less than 25 um.

8. A process for manufacturing an electrochemical cell comprising steps of:

fabricating a first and a second electrode wherein at least one of the electrodes includes a metallic current collector having a surface;

associating at least one electrolyte, having at least one solvent, with the first and second electrodes; and associating a reduced additive with at least one of the electrolyte or the at least one electrode with metallic current collector having a surface.

9. The process according to claim 8, wherein reduced additive is insoluble in the electrolyte.

10. The process according to claim 9, wherein the reduced additive is applied directly onto the surface of the at least one metallic current collector.

11. A chemical process for an electrochemical cell comprising the steps of:

fabricating a first and a second electrode wherein at least one of the electrodes include a metallic current collector having a surface;

associating at least one electrolyte, having at least one solvent, with the first and second electrodes;

associating an additive with the electrolyte or the surface of the at least one metallic current collector; and forming a passivating layer between the surface of the at least one metallic current collector and the electrolyte;

wherein the step of forming the passivating layer includes the steps of:

charging the electrochemical cell;

reducing the additive at the surface of the metallic current collector so that the reduced additive is insoluble with the electrolyte;

blocking the at least one solvent in the electrolyte from chemical interaction with the surface of the at least one metallic current collector; and precluding gas formation within the electrochemical cell as a result of decomposition of the reduced additive during cell cycling and storage.

12. The chemical process according to claim 11, wherein the electrochemical cell exhibits a first through tenth cycle coulombic efficiency greater than 85%.

13. The chemical process according to claim 11, wherein the electrochemical cell exhibits a first cycle coulombic efficiency greater than 91%.

14. The chemical process according to claim 11, wherein additive is insoluble in the electrolyte.

15. The chemical process according to claim 14, wherein the additive is applied directly onto the surface of the at least one metallic current collector.

* * * * *